US009991686B2

(12) United States Patent
Giglioli et al.

(10) Patent No.: US 9,991,686 B2
(45) Date of Patent: Jun. 5, 2018

(54) METHOD FOR STRETCHING CABLES

(71) Applicant: TESMEC S.P.A., Milan (IT)

(72) Inventors: Romano Giglioli, San Guiliano Terme (IT); Giovanni Lutzemberger, Pisa (IT); Luca Sani, Empoli (IT); Matteo Colleoni, Ponte San Pietro (IT); Alberto Oscar, Castro (IT); Maurizio Vitali, Bergamo (IT)

(73) Assignee: TESMEC S.P.A., Milan (IT)

( * ) Notice: Subject to any disclaimer, the term of this patent is extended or adjusted under 35 U.S.C. 154(b) by 143 days.

(21) Appl. No.: 14/767,889

(22) PCT Filed: Apr. 7, 2014

(86) PCT No.: PCT/IB2014/060479
§ 371 (c)(1),
(2) Date: Aug. 13, 2015

(87) PCT Pub. No.: WO2014/167476
PCT Pub. Date: Oct. 16, 2014

(65) Prior Publication Data
US 2016/0020588 A1 Jan. 21, 2016

(30) Foreign Application Priority Data
Apr. 9, 2013 (IT) .............................. MI2013A0546

(51) Int. Cl.
*H02G 1/02* (2006.01)
*H02G 1/04* (2006.01)
(Continued)

(52) U.S. Cl.
CPC .............. *H02G 1/04* (2013.01); *B65H 49/00* (2013.01); *B65H 54/00* (2013.01); *B66D 1/7405* (2013.01)

(58) Field of Classification Search
CPC ... H02G 1/04; H02G 1/00; H02G 1/06; B65H 49/00; B65H 54/00; B66D 1/7405
See application file for complete search history.

(56) References Cited

U.S. PATENT DOCUMENTS 3,488,036 A * 1/1970 Feger .................... B28C 7/0829
116/284
4,379,615 A * 4/1983 Toda .................. B65H 75/4452
242/388.6

FOREIGN PATENT DOCUMENTS

DE 1590205 5/1970
EP 1251023 10/2002
(Continued)

OTHER PUBLICATIONS

PCT International Search Report dated Jul. 14, 2014 for PCT/IB2014/060479 filed on Apr. 7, 2014 in the name of TESMEC S.P.A.
(Continued)

Primary Examiner — David Bryant
Assistant Examiner — Nirvana Deonauth
(74) Attorney, Agent, or Firm — King & Schickli, PLLC

(57) ABSTRACT

A method for stretching cables includes the steps of i) providing at least one first and one second stretching device; the first and second stretching device include at least one rotatable drum on which a cable can be wound or unwound; an electrical movement member associated to the drum for winding the cable; supply means connected to the movement member; a braking device associated to the drum and activatable for unwinding the cable; an energy recovery member associated to the drum and active simultaneously with the braking device for recovering energy during the unwinding of the cable; ii) activating the second stretching device for pulling the cable; iii) recovering energy from the first stretching device during the unwinding of the cable; and
(Continued)

iv) transferring at least part of the recovered energy from the first stretching device to the second stretching device.

13 Claims, 7 Drawing Sheets

(51) Int. Cl.
  *B66D 1/74* (2006.01)
  *B65H 49/00* (2006.01)
  *B65H 54/00* (2006.01)

(56) References Cited

FOREIGN PATENT DOCUMENTS

| EP | 1282210 | 2/2003 |
| WO | 2009/078044 | 6/2009 |
| WO | 2012/035383 | 3/2012 |

OTHER PUBLICATIONS

PCT Written Opinion dated Jul. 14, 2014 for PCT/IB2014/060479 filed on Apr. 7, 2014 in the name of TESMEC S.P.A.

\* cited by examiner

METHOD FOR STRETCHING CABLES

CROSS REFERENCE TO RELATED APPLICATIONS

The present application is the US national stage of International Patent Application PCT/IB2014/060479 filed internationally on Apr. 7, 2014 which, in turn, claims priority to Italian Patent Application No. MI2013A000546 filed on Apr. 9, 2013.

The present invention regards a method for stretching cables.

In particular, the present invention applies to the industry for stretching of metal cables for the transmission of electrical power at high or extremely high voltage, as well as cables with fibre optics, ropes in general and the like.

In addition, the present invention may apply to the stretching of metal cables of off-ground lines of railway lines.

It is known that the stretching of cables of off-ground electrical lines, data distribution lines, railway lines or others, is carried out using systems that apply the principle of "braked stretching", where one or more "hoisting device" machines recover one or more ropes or old conductors to be replaced and one or more "brake" machines that brake the new conductors during the stretching to guarantee a compact geometric configuration capable of avoiding interference with natural and/or artificial obstacles.

In particular, the aforementioned stretching systems provide for a machine with hoisting device functions configured for recovering a cable, or a steel rope, with a drawing function, through winding of the latter on a respective pair of drums or drawing capstans. The aforementioned stretching systems comprise, on the other side of the line to be stretched, a machine with braking function configured for controlling the tension of unwinding cable/s to be stretched by winding the same on the respective pair of unwinding capstans wherein the cable is drawn, for example, using the cable machine. In particular, the braking machine exerts on the cables in the stretching step a controlled tension to guarantee that the same may remain hanged on suitable guide devices provided for on intermediate supports and they are arranged according to the configuration of the suspended catenary with controlled inward bending. Thus, the cables do not drag on the ground and remain distant from any obstacles present under the cables, such as for example road or railway crossings, intersections of other electric lines etc.

The aforementioned braking stretching system may also be applied for stretching an electrical catenary for railway traction. In this case, the braking machine is mounted on a translating carriage, whether self-propelling or driven and, due to the movement of the carriage, the cable is released with a controlled tension through the action of a braking machine.

In a stretching system, the drawing machine (hoisting device) determines the speed of unwinding the cables from the respective capstans, while the braking machine determines the tension thereof.

In order to stretch the cables, there are usually used guide drawing ropes, or the same electrical cables to be replaced already present on the lines.

The stretching machines comprise two or more combined pairs of capstans, on which the cables are wound: should the cable be pulled the stretching device is used as a hoisting device, while if the cable is braked by the action of the capstan itself, the stretching device is used as a brake for regulating the correct tension of the cable during the stretching.

The known stretching apparatus comprise a motor which, operating on the, rotate then or are drawn thereby in rotation, for determining the winding or unwinding action of the cable.

The motor is generally of the hydraulic type, less typically it may be electrical.

By way of example let us consider the apparatus known from document JP S58 157307. Usually, but not exclusively, a reduction gear is arranged between the motor and the drum.

In the apparatus with hydraulic actuator there are then provided suitable hydraulic pumps and the relative control and command hydraulic circuits, as well as internal combustion engines, generally but not exclusively diesel, for the actuation of the pumps and circuits.

Disadvantageously, the current stretching devices disperse the energy generated by the braking machine into the environment in form of heat.

This implies that the known stretching methods utilising such apparatus reveal high costs due to the energetic balancing of non-satisfactory stretching operations.

In addition, the stretching apparatus of the known type are particularly heavy and cumbersome. This causes considerable difficulties in the movement of the stretching devices on the grounds, often uneven, on which they are supposed to operate. Furthermore, the presence of internal on-board combustion engines with power such to guarantee the operation thereof implies the emission of pollutant gaseous elements associated to the very engines, with evident impact on the protection of the environment.

In this context, the technical task on which the present invention is based is to provide a method for stretching cables capable of overcoming the drawback of the aforementioned prior art.

In particular, an object of the present invention is to provide a method for stretching cables capable of allowing considerable energy saving.

A further object of the present invention is to provide a method for stretching cables capable of allowing greater versatility of use.

The aforementioned technical task and object are substantially attained by a method for the stretching cables comprising the technical characteristics outlined in one or more of the attached claims.

Further characteristics and advantages of the present invention shall be more apparent from the exemplifying and non-limiting description of a preferred but non-exclusive embodiment of a method for stretching cables, as illustrated in the attached drawings wherein.

Figure 1:
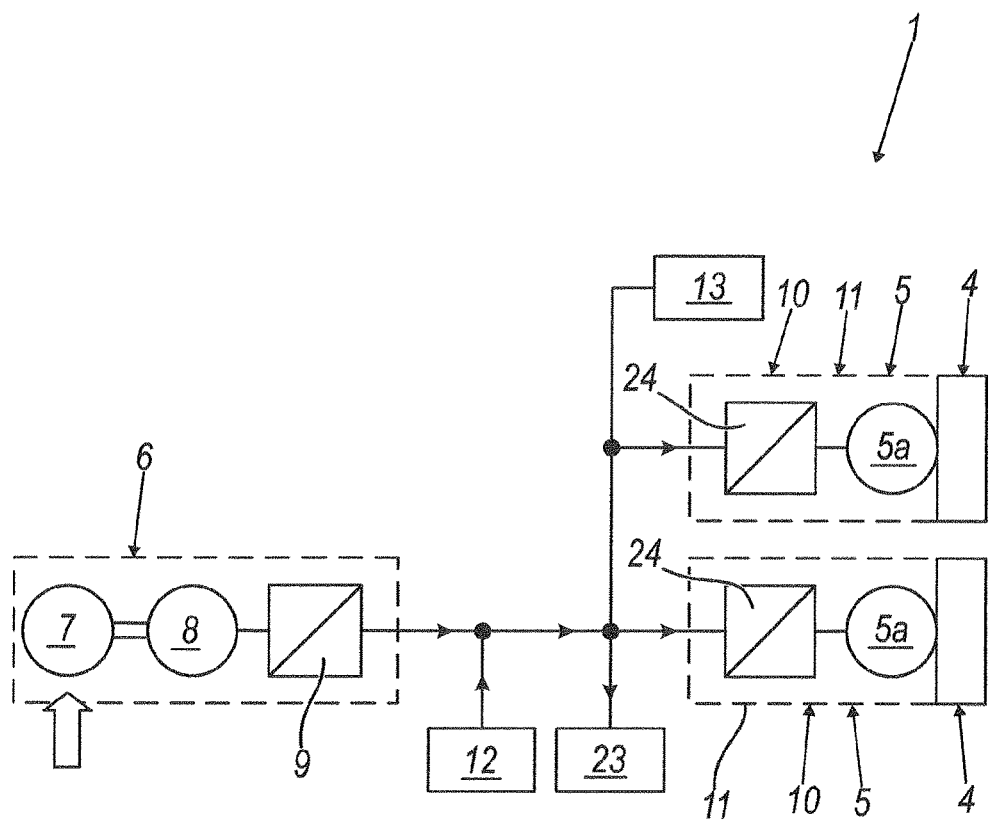
FIG. 1 is a schematic representation of a stretching device for stretching cables used according to the present invention.
Figure 2:
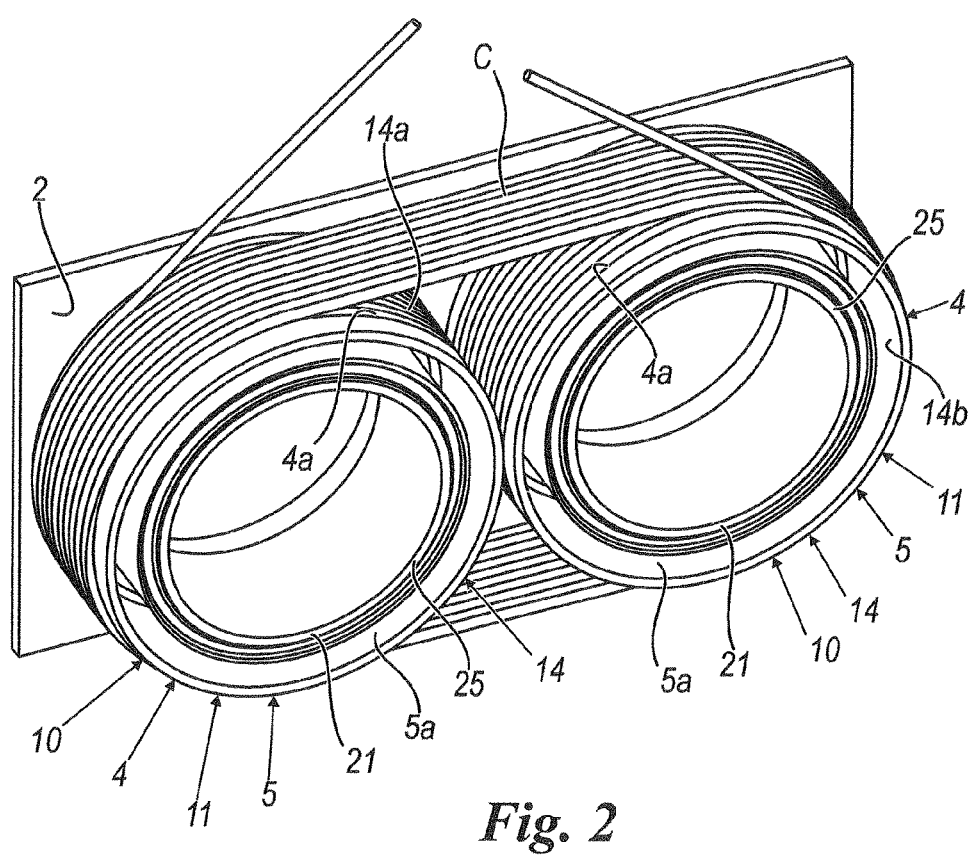
FIG. 2 is a perspective view of a portion of the stretching device of FIG. 1.
Figure 3:
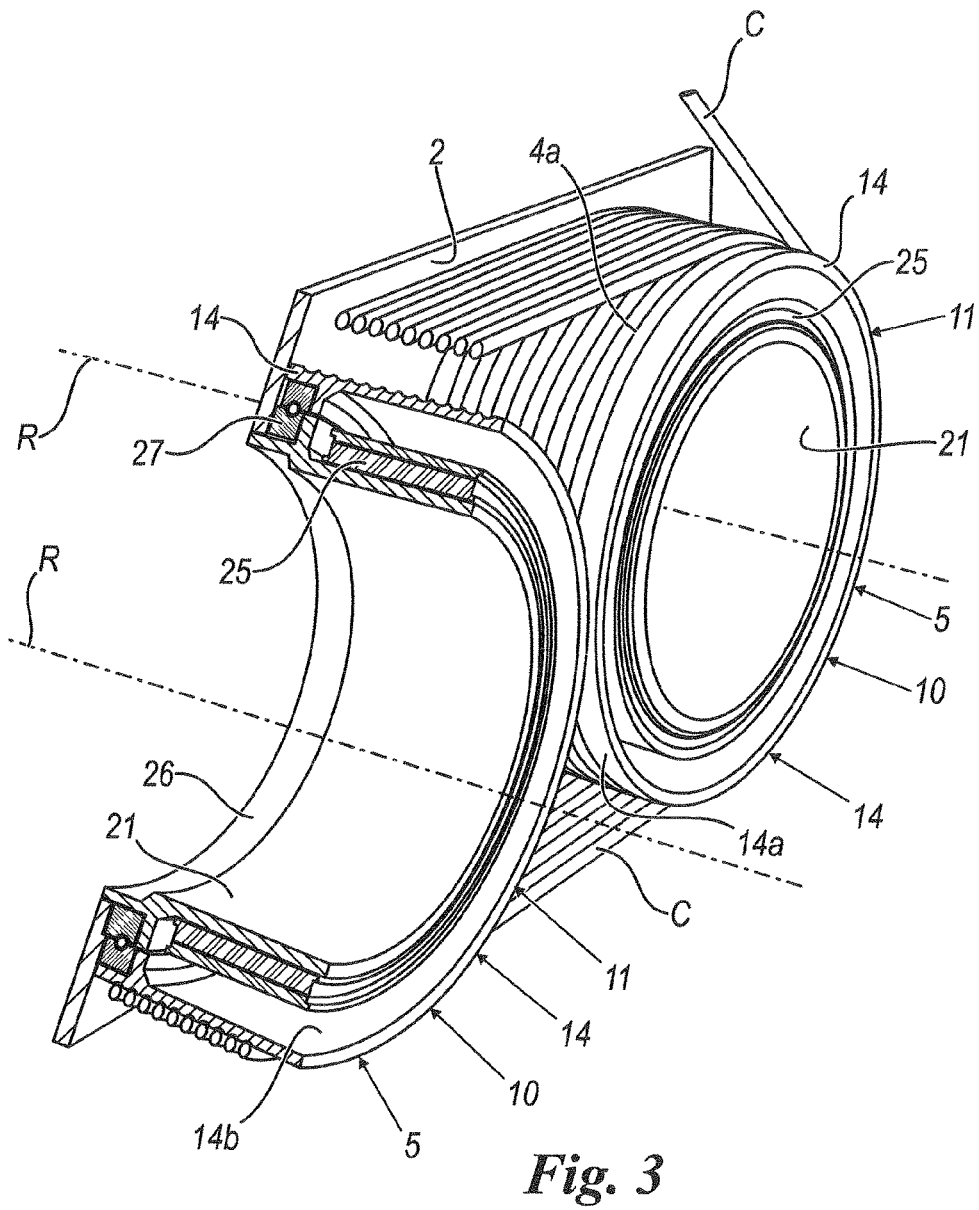
FIG. 3 illustrates a cross-sectional view of the stretching device of FIG. 2.

With reference to the attached figures, a stretching device used in a stretching method according to the present invention was indicated in its entirety with 1. The stretching device 1 may be used as a hoisting device, when pilling a conductor cable "C", or as a brake, when braking the cable.

The cable may be a metal conductor "C" for the transmission of electrical energy or a non-conductor cable used as a drawing element once connected to the metal cable to be stretched.

The stretching device 1 comprises a support structure 2 provided with support means (not illustrated) which allow correctly arranging the stretching device 1 on the ground subject of operation.

Movement means (not illustrated) may be associated to the support structure 2 and/or to the support means for allowing an easy movement of the stretching device 1 on the ground.

The stretching device 1 also comprises at least one drum associated to the support structure 2 and rotatable around a rotation axis "R". The drum 4 is also referred to as a "capstan".

Preferably, the stretching device 1 comprises two drums 4 associated to the support structure 2 and rotatable with respective rotation axis "R" parallel to each other. The rotation of the two drums 4 is synchronised.

The drums 4 have a support surface 4a on which the conductor "C" to be pulled or to be subjected to braking is wound.

The stretching device 1 further comprises a movement member 5 associated to the drums 4 for rotating them. Thus, the stretching device 1 serves as a hoisting device and the movement member 5 allows the winding of the conductor "C" on the drums 4.

Figure 6:
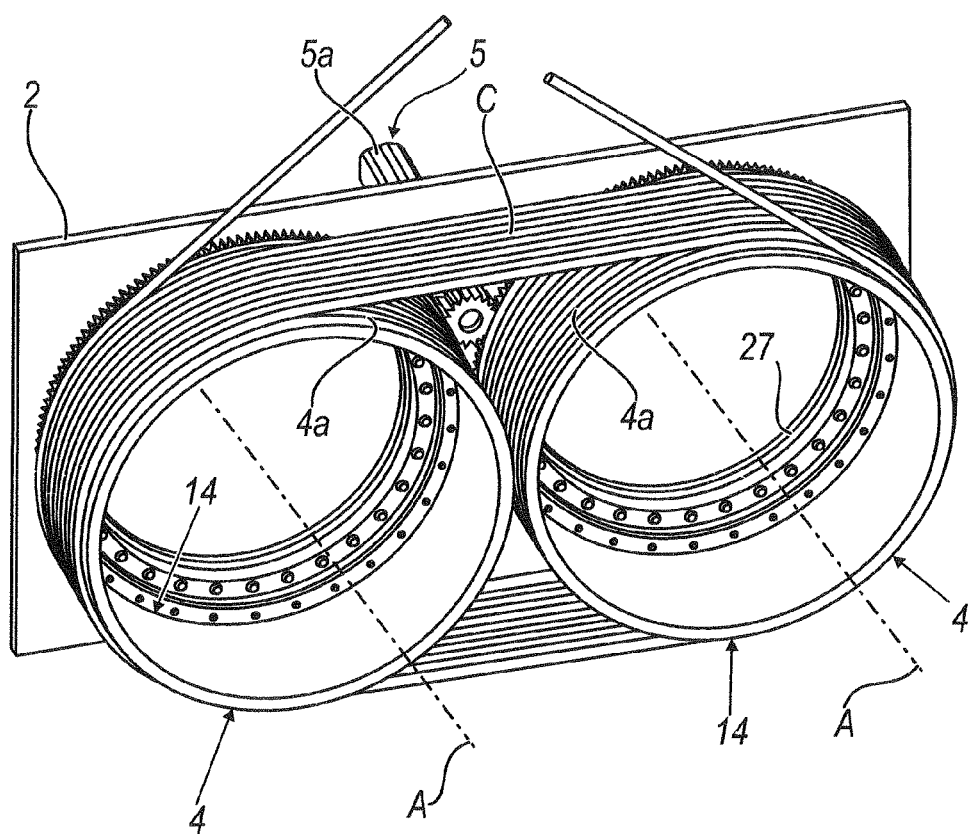
FIG. 6 illustrates a perspective view of an alternative embodiment of the apparatus of FIG. 1.

The movement member 5 may comprise a single actuator associated to both drums 4. An example of such embodiment is illustrated in FIG. 6.

Alternatively, and preferably, the movement member 5 comprises two distinct actuators 5a, each associated to a respective drum 4. In such case, the actuators 5a operate synchronised with respect to each other.

The actuators 5a may be of the hydraulic type.

Alternatively and preferably, the movement member 5 is electrical and it is integrated with the drums 4. More precisely, each electrical actuator 5a is integrated with each drum 4.

In such case, upstream of the actuators 5a there may be provided special converters 24.

Figure 4:
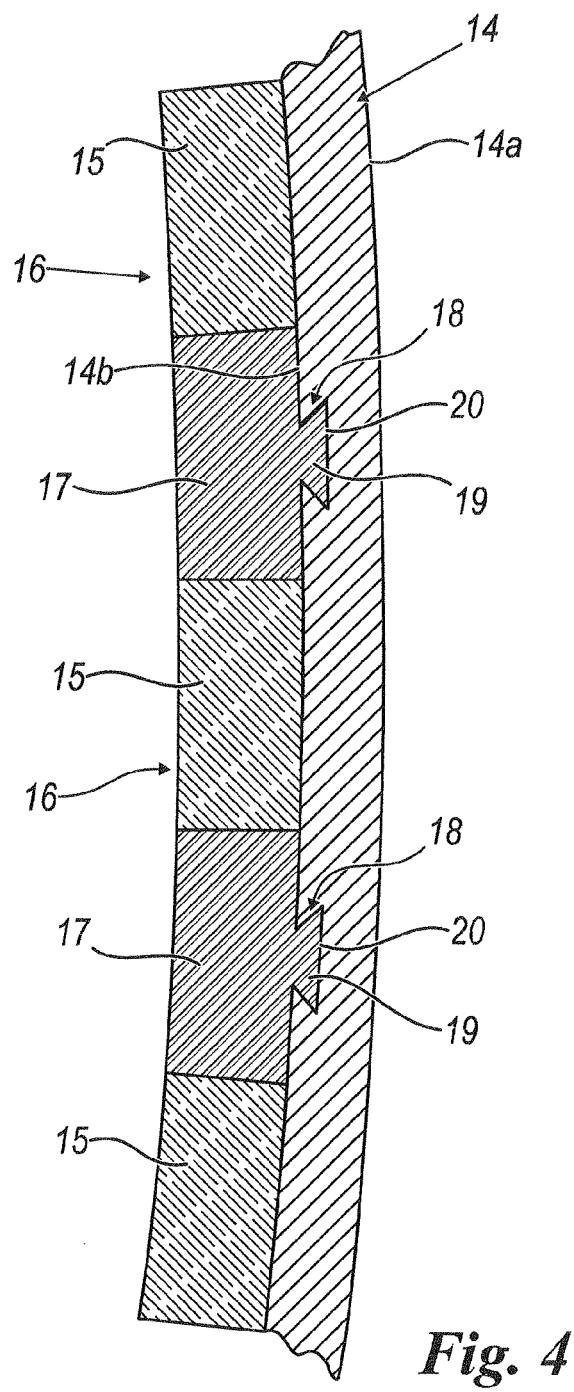
FIG. 4 illustrates a sectional view of a detail of the stretching device of FIG. 1.
Figure 5:
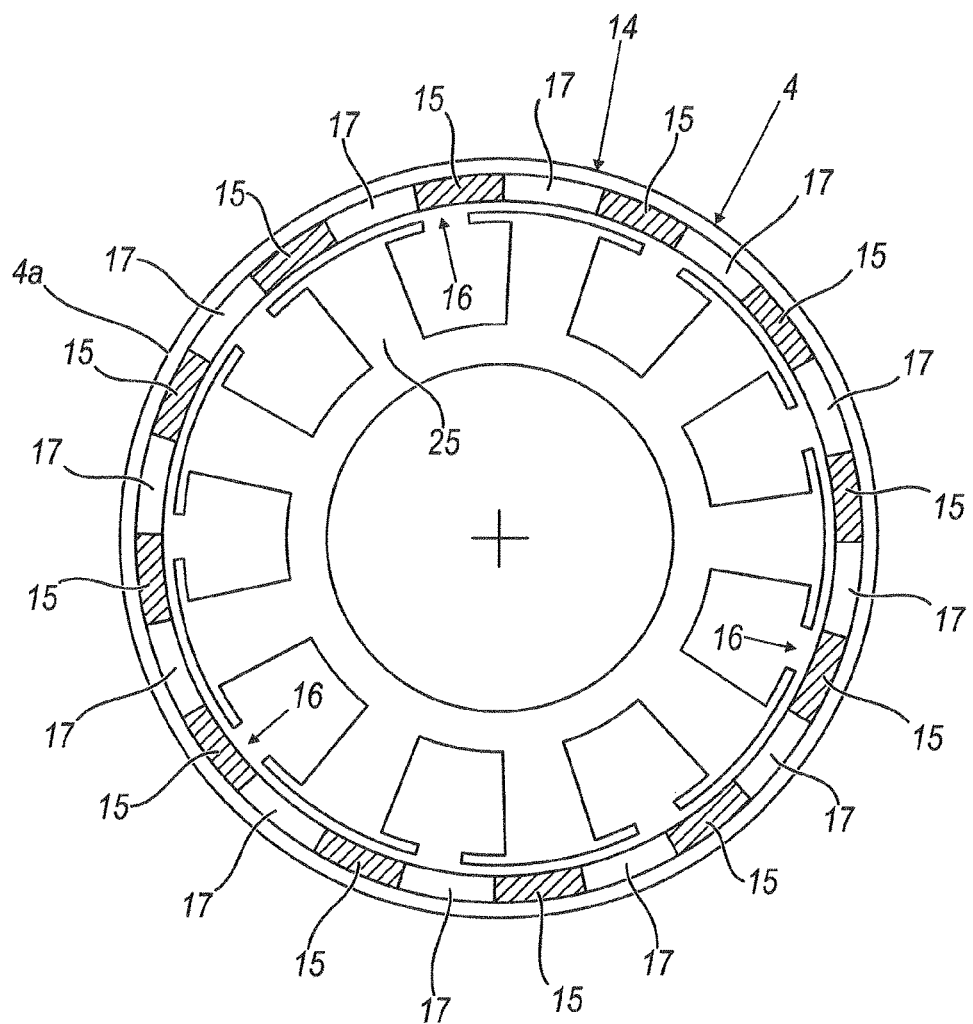
FIG. 5 illustrates a schematic view of the detail of FIG. 4.

Regarding this, and with particular reference to FIG. 4 and FIG. 5, each drum 4 comprises a tubular support 14 rotatably associated to the support structure. In particular, each tubular support 14 rotates around the rotation axis of the relative drum 4.

Each tubular support 14 has an external surface 14a and an internal surface 14b.

In addition, each drum 4 comprises a plurality of permanent magnets 15 fixed to the respective tubular support 14. In detail, the magnets 15 are fixed at the inner surface 14b of each tubular support 14.

The magnets 15 mounted on each tubular support 14 define a rotor 16 of the respective electrical actuator 5a of the movement member 5.

Preferably, the magnets 15 are equal. The magnets 15 are preferably extended parallelepiped-shaped and they develop along a longitudinal axis.

The magnets 15 are arranged on the tubular support 14 so that their longitudinal development axis are parallel to the rotation axis "R" of the tubular support 14.

Preferably, the magnets 15 have a length substantially equivalent to the height of the tubular support 14 measured along the rotation axis "R".

The magnets 15 are preferably angularly equally-shaped.

Each drum 4 further comprises a plurality of spacers 17 made of ferromagnetic material.

Each spacer 17 is arranged between two magnets 15. More in detail, each spacer 17 is at contact with the two adjacent magnets 15.

Preferably, the spacers 17 are equal. The spacers 17 are preferably extended parallelepiped-shaped and they develop along a longitudinal development axis.

The spacers 17 are arranged on the tubular support 14 so that their longitudinal development axes are parallel to the rotation axis "R" of the tubular support 14.

Preferably, the spacers 17 have a length substantially equivalent to the height of the tubular support 14 measured along the rotation axis "R".

The spacers 17 are preferably angularly equally spaced.

Preferably, the magnets 15 and the spacers 17 have a section transverse to their longitudinal axis trapezoid-shaped, preferably isosceles.

In other parole, the magnets 15 and the spacers 17 have lateral faces inclined to mutual contact along the circular development of the inner surface 14b of the tubular support 14.

The spacers 17 are fixed to the tubular support 14 through trough coupling elements 18 of the undercut type. In detail, such coupling elements 18 comprise a projection 19 developing starting from a greater base of the spacers 17 which is engaged in a corresponding cavity obtained at the inner surfaces 14b of the tubular support 14.

Even the magnets are fixed to the tubular support 14 through fixing means (not illustrated). By way of example, the magnets are fixed to the tubular support 14 using glue.

The movement member 5 comprises a stator 25 for each electrical actuator 5a. By way of example, each stator 25 comprises a plurality of electrical windings.

Each stator 25 is arranged externally at a respective cylindrical body 21 fixed to the support structure 2 of the stretching device 1.

Each cylindrical body 21, with circular section, is mounted coaxially to the corresponding drum 4.

Advantageously, the cylindrical body 21 is hollow.

Advantageously, in the cavity defined in each cylindrical body 21 it is possible to insert, at least partly, the auxiliary apparatus 23, for example electronic, of the stretching device 1.

The stretching device 1 further comprises a bearing fifth wheel 27, rigidly associated to the support structure 2, on which each rotor 16 is mounted.

Each cylindrical body 21 is mounted cantilevered on the support structure 2. In particular, the cylindrical bodies 21 are fixed at holes 26, having the same diameter as the cylindrical bodies, obtained through the support structure 2.

Each tubular support 14 is mounted cantilevered on the fifth wheel 27. In particular, the tubular supports 14 are rotatably mounted cantilevered on the fifth wheel 27. Supply means 6 are connected to the movement member 5.

In the case of hydraulic actuators, the supply means 6 feed one or more hydraulic pumps.

In the case of electrical actuators 5a, the supply means 6 feed the actuators 5a directly.

In any case, the supply means 6 are connected to auxiliary devices, represented in FIG. 1 by number 23. The supply means 6 comprise an internal combustion engine 7 connected to an electrical generator 8. Preferably, the generator 8 is of the brushless type.

A converter 9 may be arranged downstream of the generator 8.

In a first embodiment, the supply means 6 are irremovably fixed to the movement member 5.

In a second embodiment, the supply means 6 are reversibly separable from the movement member 5. Advantageously, this for example allows easily moving the two portions separately. In addition, it allows moving the supply means 6 alone between the movement members 5 of two stretching devices 1.

The stretching device 1 further comprises a braking device 10 associated to the drums 4 for braking the conductor "C". Preferably, the stretching device 1 comprises a braking device 10 associated to each drum 4. The braking devices 10 can be activated for allowing the unwinding of the conductor "C" from the drums 4 with a controlled tension. In particular, the tension operating on the conductor "C" being unwound must be such to maintain the conductor "C" stretched during the stretching, thus avoiding loose portions of the conductor "C".

Generally, the braking devices 10 can be activated alternatively to the movement member 5. Thus, the operation of the hoisting device of the stretching device 1 is markedly distinct from the brake function.

The stretching device 1 further comprises an energy recovery member 11 associated to the drums 4. Such energy recovery member 11 is active simultaneously with braking device 10 for recovering, at least in part, the energy developed during the braking.

Preferably, such energy recovery member 11 is a generator associated to the drums 4 and rotated thereby.

In the preferred embodiment, the energy recovery member 11 coincides with the movement member 5.

Should the movement member 5 comprise electrical actuators 5a, such electrical actuators 5a can be switched between a configuration in which they serve as motors and a configuration in which they serve as generators.

The energy recovered during the braking is, thus, energy electrical.

Advantageously, the stretching device 1 may comprise an accumulator 12 connected to the energy recovery member 11 for storing the recovered energy. In such case, such stored energy can be subsequently used, when the stretching device 1 is used as a hoisting device.

The accumulator 12 is a battery of the known type.

Alternatively, the energy recovery member 11 of the stretching device 1, used as a brake, may be directly connected to the movement member 5 of another stretching device 1 used as a hoisting device.

The stretching device 1 further comprises a braking rheostat 13 connected to the energy recovery member 12 for dissipating part of the energy that is not stored.

The present invention regards a method for the stretching of cables in which there are used stretching apparatus according to what has been described above.

The method provides for the initial step of providing a first stretching device, indicated with number 1f in FIGS. 7-10, and a second stretching device, indicated with number 1a in FIGS. 7-10, in two positions between which there is defined a portion in which the conductor "C" is stretched.

In the described example, the first stretching device 1f is used as a brake, while the second stretching device 1a is used a hoisting device.

A drawing rope is connected to an end of the conductor "C" to be stretched. Such conductor "C" is at least partly wound on the drums 4 of the stretching device 1f (brake). The drawing rope is wound on the drums 4 of the stretching device 1a (hoisting device).

In the case where the drums 4 of the stretching device 1a (hoisting device) are operated and recover the drawing rope, the conductor is released with controlled tension by the drums 4 of the stretching device 1f (brake).

The electrical actuators 5a of the movement member 6 of the stretching device 1f (brake) serve, in this step, as generators.

In other words, the unwinding of the conductor activates the energy recovery member 11 of the stretching device 1f (brake).

Figure 7:
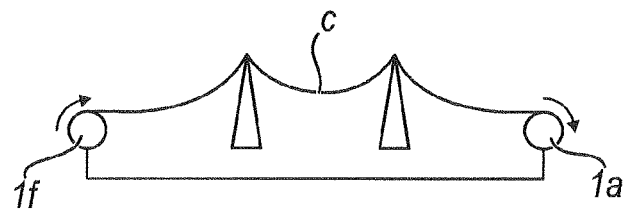
FIGS. 7-10 represent respective schematic views of respective different embodiments regarding the use of the stretching device 1 used in a stretching method according to the present invention.

In a first embodiment, the energy recovered from the stretching device 1f (brake) is instantly sent to the stretching device 1a (hoisting device). For such purpose, the movement member 5 of the stretching device 1° (hoisting device) is connected to the energy recovery member 11 of the stretching device 1f (brake) (FIG. 7). Preferably, such connection is carried out through an energy transmission electrical cable.

In a second embodiment, the recovered energy is immediately stored in the accumulator 12 associated to the stretching device 1f (brake). Preliminarily, the accumulator 12 is connected to the energy recovery member 11.

In such case, in a subsequent stretching operation, the loaded accumulator 12 is associated to the stretching device 1a (hoisting device) to feed it. The supply means of the stretching device 1a (hoisting device) may be advantageously deactivated, or used at lower power and regime with respect to the theoretical necessary, until the accumulator 12 is discharged.

In a third embodiment, the energy recovered from the stretching device 1f (brake) is partly stored and partly sent to the stretching device 1a (hoisting device).

Such method is advantageously applied to the stretching of a plurality of portions.

In such case, a plurality of stretching devices 1f (used as brakes) and stretching devices 1a (used as hoisting devices) are, two by two, arranged in respective positions between which there are defined corresponding portions in which the metal conductor cables are stretched.

In such case, the stretching devices 1f and 1a are coupled two by two. Preferably, the stretching devices 1f and 1a are arranged adjacent two by two.

In particular, the energy recovery member 11 of each stretching device 1f (brake) is connected to the movement member 5 of the respective stretching device 1a (hoisting device).

Figure 8:
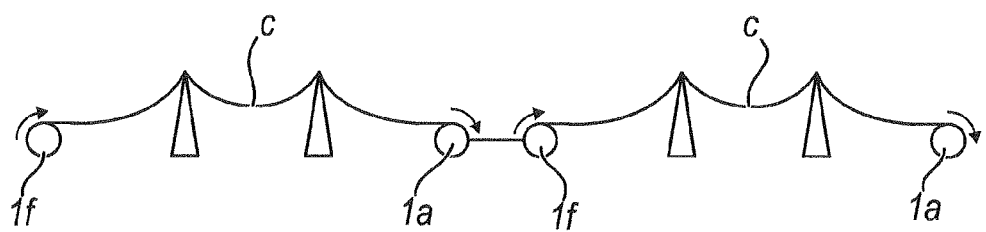

According to FIG. 8, the stretching devices 1 are arranged in line for tensioning successive conductor portions. In this case, the stretching device 1a (hoisting device) of a first portion is arranged at the device 1f (brake) of the second portion and connected to the latter for transferring the recovered energy.

Figure 9:
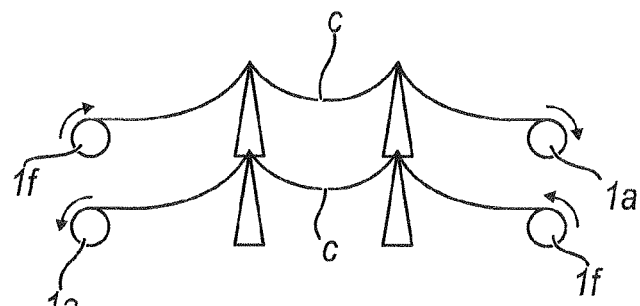

According to FIG. 9, the stretching devices 1 are coupled two by two to tension parallel conductor portions. In this case, the stretching device 1a (hoisting device) of the first portion is arranged at the stretching device 1f (brake) of the second portion, and vice versa. The adjacent stretching devices 1 are connected to each other for transferring the recovered energy.

Figure 10:
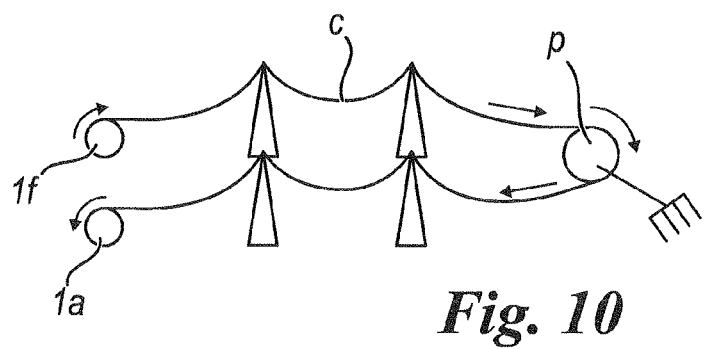

According to FIG. 10, a stretching device 1f (brake) is arranged adjacent to a second stretching device 1a (hoisting device) for obtaining the stretching of a single conductor portion "C" along a section in which the drawing rope covers the two parallel portions, by using a return pulley "P" arranged at the opposite end of the sections with respect to the stretching devices 1. Even in this case, the stretching devices 1a and 1f are connected to each other to allow transferring energy.

The activation of the stretching device 1a determines the unwinding of the cable from the stretching device 1f with ensuing recovery of energy. The latter is instantaneously sent to the stretching device 1a to supply it.

Lastly, a kit (or equipment) for stretching cables is part of the present invention.

Such kit comprises the rotatable drums 4 and the movement member 5 associated to the drums. In detail, the movement member 5 comprises two electrical actuators 5a, each active on one of the drums 4.

The kit also comprises the braking device 10 and the energy recovery member 11, preferably integrated with respect to each other, according to what has been described above, and integrated with the movement member 5.

Preferably, the drums 4, the movement member 5, the braking device 10 and the energy recovery member 11 are connected to each other and fixed through a single support framework (not illustrated) and they define an operating unit.

The kit also comprises the supply means 6 which are separate and distinct from the operative unit. The supply means 6 can be connected to the movement member 5 of the operative unit.

The kit also comprises the accumulator 12 which is separate and distinct from the operative unit. In addition, the accumulator 12 is separate and distinct from the supply means 6. The accumulator 12 can be connected to the member for the recovery of energy 11. The invention attains the proposed objects.

Actually the recovery of the energy, which would otherwise be dissipated, allows reducing the overall energy required for the operation of the stretching device, it allows reducing the installed power required of internal combustion engines, considerably reducing consumption, and thus improving the energy efficiency of the operations.

In addition, the possibility of immediately using the recovered energy or storing it allows considerable flexibility of use of the stretching devices and the relative apparatus, thus simplifying the worksite logistics.

The invention claimed is:
1. A method for stretching cables comprising the steps of:
providing first and second stretching devices, said first and second stretching devices each comprising at least one drum rotatable around a rotation axis on which there can be wound or unwound a metal cable for the transmission of electrical power; an electrical movement member for allowing the winding of said cable on each drum; a power supply connected to the electrical movement member; a braking device activatable for allowing the unwinding of the cable; an energy recovery member active simultaneously with the braking device for recovering energy during the unwinding of the cable;
activating said second stretching device for pulling said cable;
recovering energy from said first stretching device during the unwinding of the cable therefrom; and
transferring at least part of said recovered energy from said first stretching device to said second stretching device.

2. The method according to claim 1, wherein said step of transferring the recovered energy from said first stretching device to said second stretching device occurs instantaneously with respect to said step of recovery of energy.

3. The method according to claim 1, further comprising the step of connecting said first stretching device to said second stretching device through an energy transmission electrical cable; said step occurring before the activation step of said second stretching device.

4. The method according to claim 1, wherein during the step of transferring the recovered energy from said first stretching device to said second stretching device the entire recovered energy is transferred.

5. The method according to claim 1, further comprising the step of storing at least one part of said recovered energy.

6. The method according to claim 1, wherein said movement member and said member of recovery of energy coincide.

7. The method according to claim 1, wherein said first and second stretching device each comprise two drums rotatable in mutual synchronism.

8. The method according to claim 1, wherein said first and second stretching device each comprise a braking rheostat connected to the braking device.

9. The method according to claim 1, further including providing the drums for rotation about spaced axes.

10. A method for stretching cables comprising the steps of:
providing first and second stretching drums rotatable around first and second spaced axes and on which a metal cable for the transmission of electrical power may be wound or unwound, and one or more actuators for rotating the first and second stretching drums to allow for the winding of said cable on the first and second drums;
activating said second stretching drum for pulling said cable;
recovering energy from the first stretching drum while unwinding of the cable therefrom; and
transferring at least part of the recovered energy from said first stretching drum to the second stretching drum.

11. The method of claim 10, further including the step of tensioning the cable during unwinding.

12. A method for stretching cables comprising the steps of:
providing first and one second stretching devices, said first and second stretching devices each comprising at least one drum rotatable around a rotation axis on which there can be wound or unwound a metal cable for the transmission of electrical power; a movement member for allowing the winding of said cable on each at least one drum; a power supply connected to the movement member; a braking device activatable for allowing the unwinding of the cable; an energy recovery member active simultaneously with the braking device for recovering energy during the unwinding of the cable;
activating said second stretching device for pulling said cable;
recovering energy from said first stretching device during the unwinding of the cable therefrom; and
transferring at least part of said recovered energy from said first stretching device to said second stretching device.

13. The method according to claim 12, further including providing the drums for rotation about spaced axes.

\* \* \* \* \*